Dec. 12, 1950 — O. H. SCHMITT — 2,533,287
THERMISTOR SYSTEM
Filed July 22, 1946 — 2 Sheets-Sheet 1

INVENTOR.
OTTO H. SCHMITT
BY Paul, Paul & Moore
ATTORNEYS

Patented Dec. 12, 1950

2,533,287

UNITED STATES PATENT OFFICE 2,533,287

THERMISTOR SYSTEM

Otto H. Schmitt, Mineola, N. Y., assignor to Regents of the University of Minnesota, Minneapolis, Minn., a corporation of Minnesota Application July 22, 1946, Serial No. 685,350

2 Claims. (Cl. 323—68)

This invention relates to thermistor circuits. Its object is to provide for ambient temperature compensation in a thermistor system relied on for time-delay or for its non-linear resistance characteristic without resort to thermostats.

Thermistors of the type having an external heater, when used for time-delay purposes, are normally connected with the variable element in series with the controlled device, the variable element and device being connected in parallel with the heater. A given action is then expected to occur a predetermined time after the entire unit is excited from a voltage source, the action depending upon the changed resistance of the thermistor due to combined external and internal heating. According to this invention, the entire unit described is provided with a series impedance, and a circuit is arranged to shunt the unit to a varying extent, depending upon the ambient temperature. The lower the ambient temperature, the quicker must be the temperature rise of the control thermistor. This result is accomplished by including a compensating thermistor with a negative thermal coefficient of resistance in the shunt circuit to adjust the shunt current for the ambient temperature and hence to determine the current and voltage available to the heater and to the control thermistor after the voltage drop in the series impedance. It is preferable though not essential that the control thermistor be included in the compensated circuit. It might otherwise be energized from a separate source and only the heater be affected by the compensation.

Thermistors, used for their steady-state, non-linear resistance characteristic, are effected by variations in the ambient temperature. In such use, it has been known to employ energy consuming arrangements for avoiding such variations in ambient temperature. The thermistor circuit described above as useful in time-delay applications is also eminently satisfactory for compensating a non-linear circuit for wide variations in ambient temperature.

A more complete understanding of the invention will be gained from the specific disclosure which follows.

In the drawings.

Throughout the drawings corresponding numerals refer to the same parts.

Figure 1:
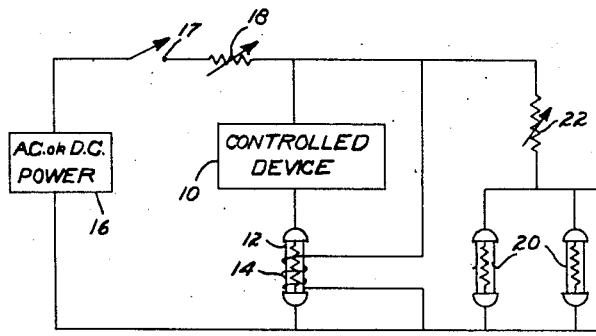
Figure 1 is a wiring diagram embodying both aspects of the invention.

The time-delay aspect of the invention is first considered. In Figure 1, a device 10 to be controlled is connected in series with thermistor 12 having external heater 14. Were a voltage impressed across circuit 10, 12, 14 alone, it would be effective at a given ambient temperature after a predetermined time to operate device 10. The time interval depends upon the heating of thermistor 12 to a critical temperature at which the thermistor is reduced to a certain resistance. Varying ambient temperatures would cause the system to operate with varying time delays. Therefore, some form of temperature compensation must be adopted for uniformity in the time-delay action.

In the past, it has been known to surround the control thermistor with controlled temperature systems of various forms, which have the common characteristic that there is power consumption in the compensation system during stand-by periods. In order to improve the efficiency of the system by eliminating any stand-by current, the present invention provides an impedance 18 which is connected in series with the usual power supply 16 through control switch 17. Heater 14 and the series circuit 10, 12 are connected in parallel, across the free terminals remaining. A circuit shunting heater 14 is provided which includes one or more thermistors 20 having a negative temperature coefficient of resistance optionally in series with an impedance 22. Where power supply 16 is direct current, impedances 18 and 22 should be resistors. They may be resistors or impedances when alternating current power supply is used.

In operation the impedance of shunt circuit 20, 22 will be higher than normal for lower than normal temperatures and, consequently, will produce a lower voltage drop in impedance 18 for such subnormal temperatures. This causes quicker heating of thermistor 12 largely because of the higher voltage impressed on its heater 14 and, incidentally, more prompt response of the controlled device 10 due to this higher voltage impressed on its series circuit 10, 12.

Figure 2:
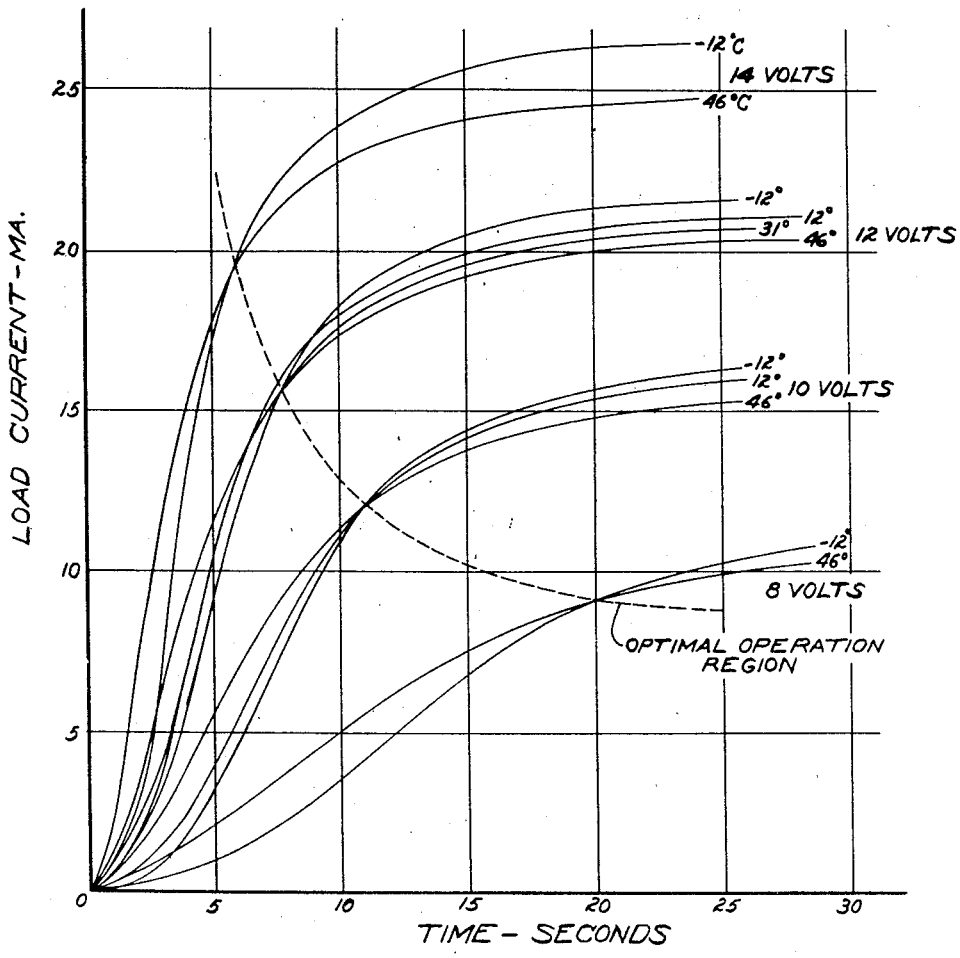
Figure 2 is a graph of the current in the controlled device as a function of time for a predetermined set of constants in a thermistor time-delay system.

It will be evident that varying degrees of temperature compensation may be attained by varying the components used. Figure 2 shows the operational characteristic of the circuit in Figure 1 with various direct-current supply voltages of from 8 to 14 volts and for various ambient temperatures from —12° C. to 46° C. Impedance 18 was a resistor of 600 ohms, controlled device 10 had a resistance of 75 ohms, two thermistors 20 used were of the Bell Telephone Laboratories type ESP-629867, and thermistor 12, 14 was B. T. L. type D-158997.

The broken line (Figure 2) connects points of substantially perfect ambient-temperature compensation for each value of supply voltage. If the desired time delay for operation of device 10 has been determined, substantially perfect temperature compensation for ambient temperature variations can be obtained merely by adjusting the supply voltage and keeping all the constants as specified. However, where the current through the control device as well as the time for perfect compensation are predetermined, it will be necessary to vary one or more of the impedances and/or thermistors. While the broken line indicates the optimum operation region for the above constants with various supply voltages, there is nevertheless very good compensation for any given supply voltage, even though the impedances and thermistors are not adjusted for perfection, and something other than optimum time-delay is required.

In typical cases of operation, about one-half of the final current and three-quarters of the applied voltage appear in the circuit of device 10 and heater 14 so that overall energy efficiencies of the order of 40 per cent are not exceptional. This efficiency makes the system here disclosed of value where little energy is to be wasted and where no local power is to be used continuously.

As stated above, the circuit of Figure 1 is useful with other constants for ambient temperature compensation of a thermistor and load circuit, wherein the thermistor is relied on as a non-linear resistor in steady-state conditions. Under certain circumstances (as in transient-insensitive generator controls), it is desirable to vary the steady-state current in controlled device 10 as a non-linear function of the applied voltage. Were the device 10 and thermistor 12 used without compensation, the current for any particular voltage would be a widely-varying function of the ambient temperature.

Figure 3:
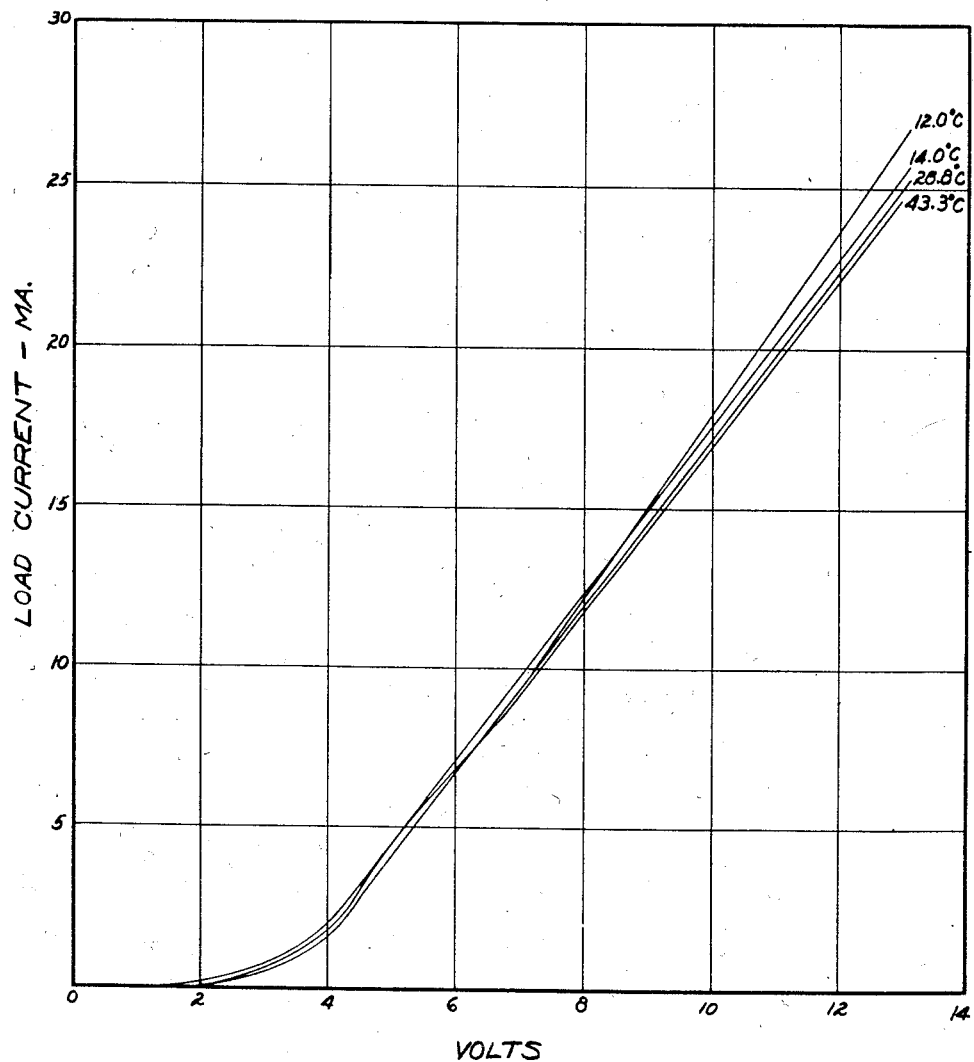
Figure 3 is a graph of steady-state current in the load or controlled device of Figure 1 when varying voltage is impressed.

Figure 3 is a graph of the performance of device or load 10 and thermistor 12 when included in the compensation circuit of Figure 1. To obtain the curves shown, a single thermistor 20 B. T. L. type ESP-629867 in series with resistor 22 of 600 ohms and resistor 18 of 250 ohms were used in association with a load of 75 ohms, a milliammeter (not shown), and an externally heated thermistor 12, 14 B. T. L. type D-158997. It will be noted from Figure 3 that the compensation for ambient temperature is not perfect, but the results obtained demonstrate great improvement over the uncompensated circuit. As in the time-delay application of this circuit, there is increased efficiency in this form of compensation compared with one in which the thermistor is held at a constant temperature by means of a separate power-consuming thermostated device. Furthermore, no distinct power supply is required for compensation in the invention disclosed, an important advantage where thermistors may be numerous and located remote from each other.

As many apparently widely different embodiments of this invention may be made without departing from the spirit and scope thereof, it is to be understood that I do not limit myself to the specific embodiments herein except as defined by the appended claims.

What I claim is:

1. A series circuit, a circuit interrupter, an impedance, an controlled device and a thermistor connected in series, a first parallel branch having a heater element therein which is positioned so as to heat the thermistor and a second parallel branch having a resister in series with a thermistor which has a negative thermal coefficient of resistance, each said parallel branch being connected in parallel with that portion of the series circuit which includes the serially connected control device and thermistor.

2. A control circuit having a source of potential to which there is connected a control device and a serially connected first thermistor, an electric heater situated so as to heat the thermistor, a circuit in parallel with said heater including a resistance and a second thermistor connected in series, said second thermistor having a negative temperature coefficient of resistance, said electric heater and circuit in parallel therewith being connected through an impedance to a potential source.

OTTO H. SCHMITT.

REFERENCES CITED

The following references are of record in the file of this patent:

UNITED STATES PATENTS

| Number | Name | Date |
|---|---|---|
| 1,927,512 | Baloun | Sept. 19, 1933 |
| 2,332,073 | Grierson | Oct. 19, 1943 |
| 2,339,029 | Pearson | Jan. 11, 1944 |
| 2,341,013 | Black | Feb. 8, 1944 |
| 2,465,683 | Griesheimer | Mar. 29, 1944 |

OTHER REFERENCES

"Properties and Uses of Thermistors—Thermally Sensitive Resistors," Becker et al., "Electrical Engineering," November 1946, pages 711-725.